Figure 1:
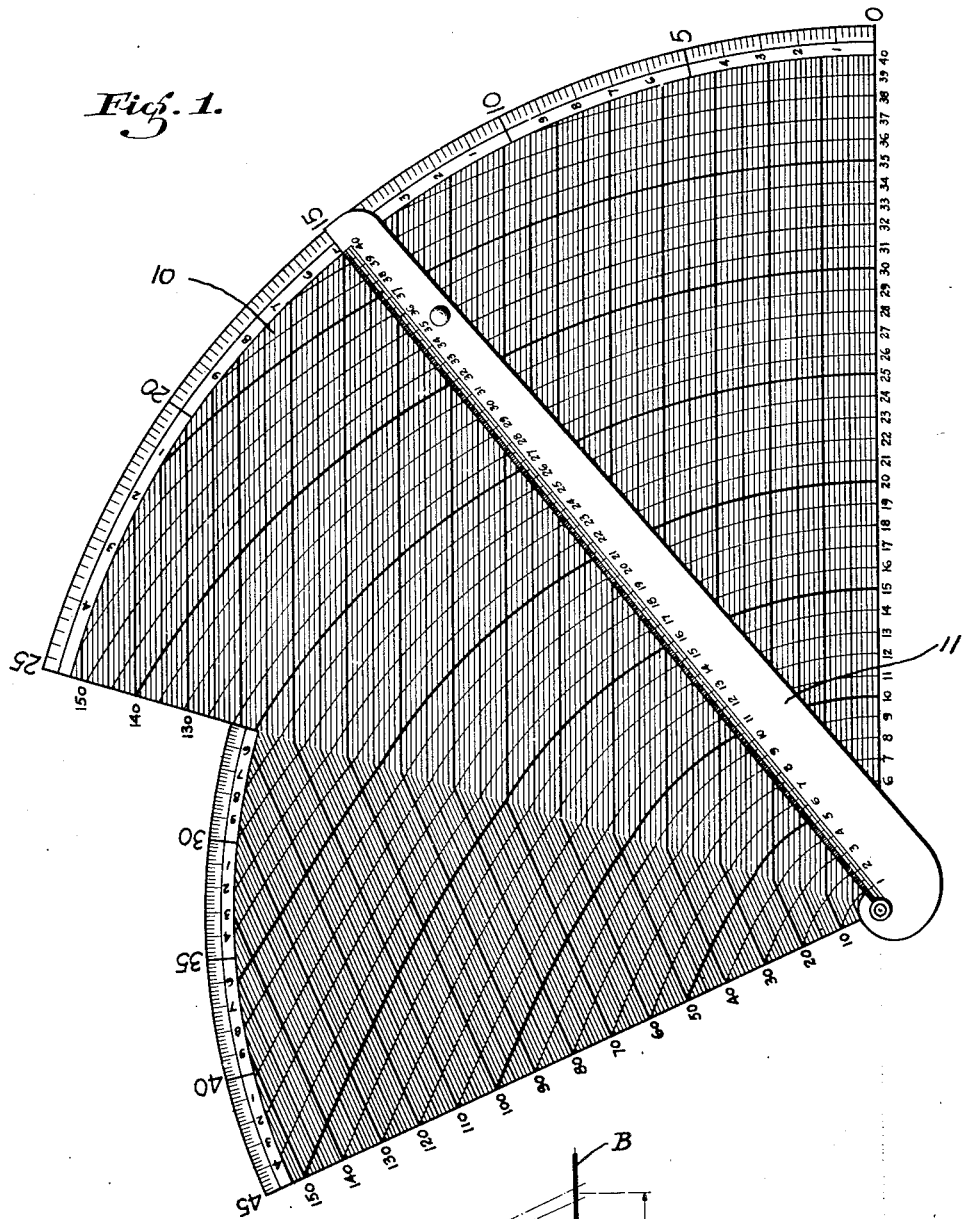

April 28, 1931.  D. J. FEE  1,802,969
STADIA CALCULATOR
Filed June 6, 1929

INVENTOR.
Daniel Jerome Fee.
BY
Townsend, Loftus & Abbott
ATTORNEYS.

Patented Apr. 28, 1931

1,802,969

UNITED STATES PATENT OFFICE

DANIEL JEROME FEE, OF SAN FRANCISCO, CALIFORNIA

STADIA CALCULATOR

Application filed June 6, 1929. Serial No. 368,763.

My present invention relates to a calculating device for computing stadia notes such as are used in topographical surveying.

An object of my invention is to provide a device for conveniently and readily solving the equations:

Horizontal distance=R cos²(a)
Vertical distance=R ½ sin (2a)

A further object of my invention is to provide a device of the above character by means of which the above results may be quickly and readily obtained by a simple, mechanical operation of the device and one which, because of its proportions, is easy to read and which may be cheaply and economically constructed.

For the purpose of facilitating an understanding of my invention, I have shown in the accompanying drawing one form which my improved device may take. I desire to have it understood, however, that this drawing is to be taken as illustrative and not as limiting my invention in any respect.

In the drawing—

Figure 2:
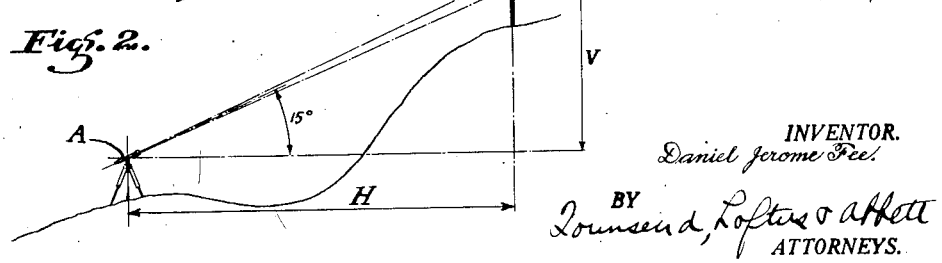

Fig. 1 is a plan view showing my improved calculator with the indicia marked thereupon, and Fig. 2 is a schematic representation of one method by which the data to be computed is to be obtained.

With my device, the trigonometric relationship expressed by the standard equation for vertical distance, V=R ½ sin (2a)

is transformed by a simple change of two scales into the convenient trigonometric relationship of an angle and its sine.

So far as I know, this is the only device which recognizes a fundamental fact, namely, that the trigonometric relationship expressed by the above equation for vertical distance can, by a simple change of two scales, be transformed into the convenient trigonometric relationship of an angle and its sine. This change, in the embodiment of my invention illustrated in the drawings, consists in making the angular scale read one-half or less than one-half the value of the actual graphical angle; and in making the vertical scale, by which the result is read, twice as large as the scale of distances on the radial arm. These changes produce the following advantageous results:

(1) It allows the vertical distance to be obtained graphically, as a vertical distance to a uniform scale, by one simple radial movement of the arm. This is the natural and easy way to read this vertical distance, as it does not require the concentration attendant upon a scale which is not uniform, as is the case in connection with the use of a slide rule in this computation.

(2) The changes in the scales are such as to double the graphical segments to be measured by the eye and thus, as a result, one of the primary objects of my invention, namely, ease of reading, is accomplished.

(3) The scales for rod reading, angle, and vertical distance, are all uniform and this further contributes to ease of reading and the prevention of errors. The vertical distance in this instance appears graphically as a vertical distance, making it a natural and easy value to read and, as a result, precludes a common source of error which is present in other instruments, namely, that of misplacing the decimal point.

A further and important advantage lies in the fact that greater accuracy and ease of reading is possible, as an instrument of this type with a radial arm of 20 inches (which is not too large for convenient use) and reading up to 400 feet (which is beyond the usual limit for most stadia work) gives a larger "smallest division" for all three scales than is customary with other instruments of this type having logarithmic and non-uniform scales.

In Fig. 1 of the drawing, 10 designates a chart graduated as will hereinafter appear and having a radial arm or cursor 11 which pivots about a central point over the calibrations of the chart. The outer circular edge of the chart is graduated and designated by certain figures which represent degrees and the two radial edges are marked to identify on the horizontal edge the horizontal distance; and on the angular edge, both the horizontal and vertical distances are designated. The cursor is graduated uniformly and designated by figures to represent "rod reading" or stadia intercept. These figures, of course, are subject to an unlimited interpretation, depending upon the position of the decimal point, as is the case in slide rule computations; for instance, the designation 150 might be interpreted to be 15, 150, or 1500, etc.

In taking stadia readings as at present practiced, the surveyor will set up his transit, as, for instance, at the point A in Fig. 2, and will sight the rod at, for instance, the point B. In this operation, the telescope will be pitched to the proper angle to sight the rod at a desired point, the rod being held perpendicular by the rod man. In this sighting, the observer will note the stadia intercept upon the rod, this being indicated, as is well understood in the art, to be the difference in the readings of the top and bottom cross wires of the transit. In the example here given, the lower wire is shown at 5.0 feet on the rod and the upper wire is shown at 6.5 feet on the rod. The difference between these readings is what is termed the stadia intercept and from this reading and the angle of the transit, it is possible with my improved device to immediately determine the horizontal distance H and the vertical distance V indicated in this figure of the drawing. In solving this particular problem, the cursor 11 will be placed on the angle 15, which corresponds to the vertical angle of the telescope, and by tracing the curved lines from the point 15 which correspond to the stadia intercept 1.5 on the cursor 11, the reading 140 feet may be read at the left hand edge of the chart, and by tracing from this same point on the cursor along the horizontal lines, the vertical distance may be read off on this same edge of the chart as being 37.5 feet.

From this operation, it will be seen that the problem of computing the horizontal and vertical distances is greatly simplified and that by reason of the two readings being taken from the same scale, the possibility of an erroneous reading thereof is eliminated. The result for the horizontal distance is given by curves which are entirely new and unique and which offer the outstanding advantage that the result is found opposite the rod or stadia reading on the arm at the same point which gives the result for vertical distance. This property of giving simultaneously the two answers, it will be appreciated, contributes greatly to speed in the calculations.

In the embodiment of my invention illustrated in Fig. 1, I have shown for that part of the diagram, covering the angular range from zero to twenty-five degrees, a vertical scale exactly two and one-half times as large as the scale for "rod reading" on the cursor. For the remaining portion of the diagram, the vertical scale is exactly twice as large as the cursor scale. In either case, the choice of relation between these scales determines mathematically a single and unique angular graduation, and while other ratios than two, or two and one-half, may be used with other corresponding angular graduations, the underlying principles are the same.

Moreover, once the relation between vertical scale and cursor scale has been chosen, the curves are mathematically defined which give the result for horizontal distance.

My device could be made in a ninety degree section, with the vertical scale just double the cursor scale, in which case the angular graduations must be nominally exactly twice the true angle set off by the cursor. But for greater accuracy, I desire to extend my chart over more than ninety degrees. In use, one is unconscious of passing from one part of the diagram to the other and, since this change results in a gain in increased "smallest division", it will be readily accepted.

In the following claims I desire to have it understood that I aim to cover all embodiments of my invention which fall within the spirit and scope of the claims appended hereto.

Having thus described my invention, what I claim and desire to secure by Letters Patent is—

1. A calculator for simultaneously solving the equations

Horizontal distance $= R \cos^2 (a)$
Vertical distance $= R \frac{1}{2} \sin (2a)$ comprising a chart having intersecting straight and curved lines representing respectively the vertical and horizontal distances to be determined, and a cursor adapted to move about a fixed pivot and over said chart having indicia thereupon corresponding to the stadia intercept readings of a transit by means of which when the cursor is placed at an angle corresponding to that of the transit at sighting a direct reading of the vertical and horizontal distances may be made directly from the chart.

2. A stadia calculator of the character described, comprising a chart having intersecting straight and curved lines corresponding to the vertical and horizontal distances involved in stadia calculations, radially arranged indicia upon said chart calibrated in degrees corresponding to a transit elevation reading, and a cursor having stadia intercept indicia thereupon adapted to co-operate with said degree calibrations and said straight and curved lines to make possible the simultaneously direct reading upon said chart of the horizontal and vertical distances involved in the equations Horizontal distance = $R \cos^2 (a)$
Vertical distance = $R \tfrac{1}{2} \sin (2a)$ 3. A calculator for stadia computations comprising a chart having horizontal and curved intersecting lines corresponding to the vertical and horizontal distance involved in stadia calculations, angular graduations associated with said chart having indicia equalling one-half of the actual angle, and a cursor adapted to co-operate with said angular calibrations having graduations thereupon corresponding to the stadia intercept upon a rod, whereby with a predetermined stadia intercept reading it will be possible to read directly from said chart the horizontal and vertical distances corresponding thereto.

DANIEL JEROME FEE.